June 30, 1931.　　　　F. E. JEWETT　　　　1,812,534
METHOD OF AND APPARATUS FOR FEEDING MOLTEN GLASS
Filed June 11, 1928
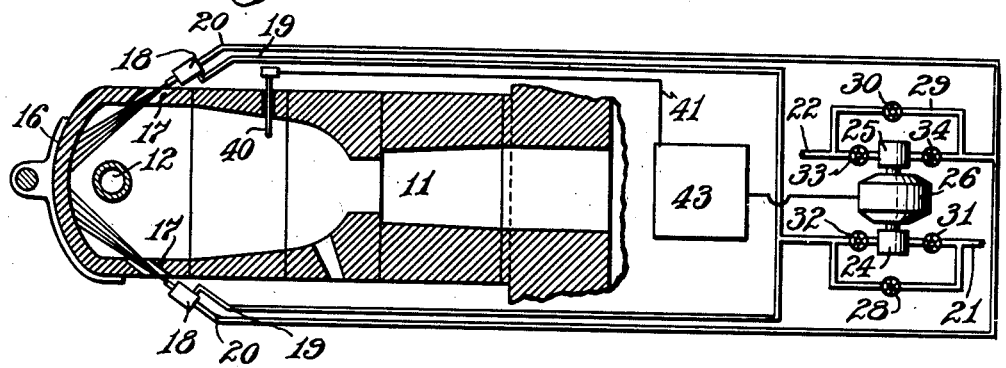
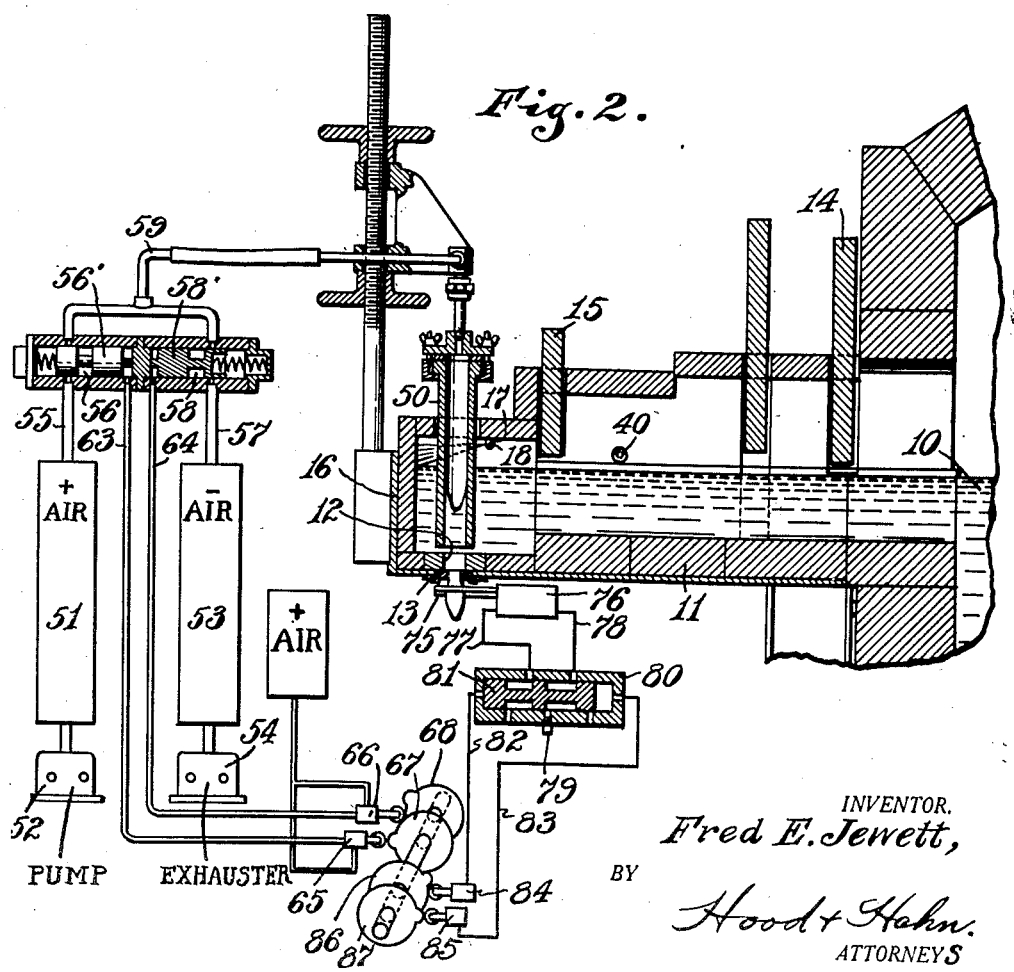
INVENTOR.
Fred E. Jewett,
BY
Hood + Hahn.
ATTORNEYS Patented June 30, 1931

1,812,534

UNITED STATES PATENT OFFICE

FRED E. JEWETT, OF MUNCIE, INDIANA, ASSIGNOR TO BALL BROTHERS COMPANY, OF MUNCIE, INDIANA, A CORPORATION OF INDIANA

METHOD OF AND APPARATUS FOR FEEDING MOLTEN GLASS

Application filed June 11, 1928. Serial No. 284,364.

In the production of successive masses of molten glass from a submerged outlet and of such character that they may be subsequently manipulated, in forming-molds, into desired articles of manufacture, it is customary to form a submerged outlet through the flow of a flow spout which is connected to a suitable source of supply such for instance as a continuous melting tank, and to provide means, operating in conjunction with the glass immediately adjacent the submerged outlet, to control the flow of glass relative to the orifice.

It has been well-known that the quantity of glass which may be delivered through the orifice during any cycle of the operation of the controlling mechanism will be dependent upon the temperature of the glass at or immediately above the orifice and various means have been heretofore provided for the attempted control of the glass temperature within the flow spout, but, so far as I know, no one prior to my present invention has produced any apparatus which would produce entirely satisfactory results and as a consequence mechanism has had to be provided by which the various elements of the flow controlling mechanism could be readily adjusted during operation of the apparatus in order to make possible a compensation from time to time for the variations of flow which were unavoidably concurrent with variations in glass temperature, and there has been a necessity for considerable manipulation of the flow-controlling mechanism from time to time in order to maintain substantial uniformity of weight of the finished product.

The object of my present invention is to provide means by which the temperature of the glass immediately adjacent the supply side of the submerged orifice may be automatically maintained substantially uniform through a long and continuous period of time so that, the mechanical elements of the flow-controlling mechanism being once set in accordance with the needs of the forming mechanism which is to be supplied by successive charges of molten glass, further manual manipulation of said mechanical elements during operation will not be necessary to maintain commercial uniformity of the successive charges of molten glass.

To this end I provide means for intermittently and automatically applying heat to the surface of the molten glass immediately above the submerged outlet by mechanism which is automatically controlled by variations in temperature, of the glass above the submerged orifice or immediately adjacent the glass as it proceeds to a point immediately above the orifice closely adjacent thereto.

The precise character of the mechanism for manipulating the flow of glass through the orifice forms no part of my present invention and in the drawings I have shown the particular mechanism for this purpose merely as illustrative of one of several forms of such mechanism which can be satisfactorily used.

The accompanying drawings illustrate my invention.

Fig. 1 is a diagram, in plan, of a flow spout having a submerged orifice, heating mechanism for heating the glass immediately above the orifice and controlling mechanism for the heating mechanism; Fig. 2 is a diagram, in vertical section of some of the parts shown in Fig. 1 and of a mechanism for controlling the flow of the properly heated glass through the orifice.

In the drawings 10 indicates a suitable source of supply of molten glass as for instance a continuous melting tank and 11 a flow spout communicating therewith, the flow spout extending in the usual manner from the side of the furnace and provided near its outer end with a submerged outlet 12 in its floor, an interchangeable orifice ring 13 being conveniently associated with the lower end of said outlet to provide an outlet of proper size for the articles which are to be fabricated.

The top of the flow channel of the spout is roofed over so as to protect the surface of the glass from external temperatures and, in the form shown, vertically adjustable baffle plates 14 and 15 are provided, preferably one closely adjacent the junction with the tank and one at an intermediate point in the length of the spout, as indicated in Fig. 2 for controlling the circulation of heat from the tank and also from the special burners to be described.

The nose of the flow spout, as indicated at 16, is slightly rounded and at each side the vertical walls of the nose are perforated at 17, 17 by passages which are directed forwardly and downwardly towards the inner face of the rounded wall 16, these perforations 17 converging to an area adjacent the medial line of the spout and near the normal glass level.

Arranged so as to discharge through each of the perforations 17 is a gas burner 18 to which is led a gas supply pipe 19 and an air supply pipe 20 which pipes are connected, respectively, to a gas supply line 21 and an air supply line 22. In the gas supply line is a valve 24 and in the air supply line is a valve 25 and these two valves are simultaneously opened or closed by a suitable automatic mechanism, most conveniently a small electric motor 26 which is so constructed as to move and stop in half cycles.

That is to say, the valves 24 and 25 being closed, an energization of motor 26 will permit it to move until the valves 24 and 25 have been fully opened, whereupon the motor will automatically stop, and, upon the next half cycle energization of the motor will cause the valves 24 and 25 to close and the motor to again stop. Valve actuating mechanisms of this particular character, and the starting and stopping means therefor may readily be obtained as they are common and well-known in other arts and therefore need no further description.

In order that a pilot flame may be constantly maintained at the burners 18, a small amount of gas and air are by-passed around the valves 24 and 25 as indicated in Fig. 1, the gas by-pass 27 being provided with an adjustable controlling valve 28 and the air by-pass 29 being provided with an adjustable valve 30.

In order to obtain accurate control of the flow of gas and air I have found it desirable to provide, upon each side of valve 24 adjustable valves 31 and 32 and, similarly, adjustable valves 33 and 34 upon each side of valve 25.

Projected into the flow spout at a point intermediate between the tank and the burners 18 is a thermo-couple 40 the inner end of which most conveniently lies closely adjacent the level of the glass stream. This thermo-couple might be projected directly into the stream of glass, at the point indicated or more closely adjacent the submerged outlet, but it has been found by experience that it is quite difficult to adequately protect the thermo-couple for long life when projected directly into the glass and I have found that sufficiently accurate, and promptly responsive results are obtained by placing it as described. In practice I find that it is desirable to place this thermo-couple fairly close to the axis of the submerged outlet but away from direct contact by the flames from the burners 18.

Thermo-couple is connected by the usual circuit wires 41 with an electrical instrument which will automatically control the energizing circuit 42 of the motor 26 in accordance with the temperature variations affecting the thermo-couple. For this purpose any one of several well-known mechanisms may be utilized and I have found that an apparatus commonly known as the Leeds & Northrup temperature control 43 will be satisfactory. The precise details of construction of this instrument 43 are not material except that the mechanism is of such character that, as the temperature of the thermo-couple rises and falls to predetermined points, the motor 26 will be energized to cause it to move through half a cycle and thus respectively close or open the valves 24 and 25. The instrument 43 may be so adjusted as to cause actuation of the motor 26 at desired predetermined maximum and minimum temperatures so that, as the temperatures of the glass flowing to a point immediately above the submerged orifice falls and rises, the burners 18 will be caused to intermittently and automatically, at proper times, project flames into the nose of the flow spout upon the glass immediately above the submerged orifice so as to automatically maintain that glass at a temperature, within a comparatively short and predetermined range, which, for the particular articles to be fabricated, is found to be the best working temperature to facilitate the production of successive charges of desired mass and form, thereby maintaining the temperature of the glass emerging from the orifice within the most effective range.

As previously stated, the precise form of the mechanism for otherwise controlling the flow of glass through the outlet may take any one of a number of forms. The mechanism, shown in the drawings comprises a refractory tube 50 arranged in vertical alignment above the submerged outlet with its lower end submerged in the glass and brought to a point sufficiently above the upper end of the outlet to permit a desired flow of glass between said lower end and the flow of the flow spout immediately surrounding the outlet.

In order to subject the top of the glass in tube 50 alternately to superatmosphere and subatmosphere, a tank 51 is connected to a pressure producing pump 52 and a tank 53 is connected to an exhauster 54. A pipe 55 leads from tank 51 to a valve chamber 56 and a pipe 57 leads from tank 53 to a companion valve chamber 58. The two valve chambers 56 and 58 are connected by pipe 59 which leads to tube 50.

In chamber 56 and 58 are pneumatically-actuated valves 56' and 58' respectively, which are spring biased to close communication between tube 50 and tanks 51 and 53 respectively. Leading to the actuating ends of valves 56' and 58', respectively, are pipes 63 and 64 which lead to valves 65 and 66, respectively, controlled by timer cams 67 and 68, respectively. Valves 65 and 66 control flow of air from a suitable source of air pressure 60 and to atmosphere so as to intermittently cause actuation of valves 56' and 58'.

The glass which is delivered through the orifice block 13 is cut by shears 75 of well-known form which, in the present diagrams are indicated as an air-operated mechanism 76 the flow of air to it being through pipes 77 and 78 receiving air from supply line 79 through a valve casing 80, the movement of the valve 81 of which is determined by the flow of air through pipes 82 and 83 which flow is controlled by valves 84 and 85, respectively, manipulated by cams 86 and 87 respectively.

The cams 67, 68, 86 and 87 are continuously rotated by any suitable means and preferably in synchronism with the forming machine (not shown) to which the successive charges of glass, after severance by the shears, are to be delivered.

It is to be understood that the phrase "intermediate between the supply and the delivery end of the submerged orifice" is intended to mean any point at which the temperature of the glass prior to its emergence from the delivery end of the orifice will satisfactorily affect the thermo-couple and where the thermo-couple will be protected from the immediate heat of the flames from the burners 18.

I claim as my invention:

1. That improvement in the art of producing successive charges of molten glass which comprises the establishment of a supply of molten glass toward and above a submerged outlet, and locally heating the surface of the glass above the submerged outlet in accordance with temperature conditions at a point between the supply and the point of such local heating.

2. That improvement in the art of producing successive charges of molten glass which comprises the establishment of a supply of molten glass toward and above a submerged outlet, and the intermittent local application of heat to the surface of the glass between the source of supply and the discharge end of the orifice and in accordance with the temperature of the glass at a control point between the source of supply and the point of such application of local heat, beginning when the temperature of the glass at the control point has dropped to a predetermined minimum above the gravity-flow temperature of the glass and continuing until the glass at the control point has been raised to a predetermined maximum.

3. The combination of a source of molten glass, a flow spout communicating therewith and provided with a submerged outlet, means for delivering heat locally to the surface of the glass between the supply source and the delivery end of the outlet, a thermo-couple arranged adjacent the glass in the flow spout between the source of supply and the outlet and away from direct heat from the local heating means, and means controlled by said thermo-couple for automatically delivering such local heat to the glass when the temperature adjacent the thermo-couple descends to a predetermined point above gravity flow temperature of the glass and for automatically discontinuing the delivery of such local heat when the temperature of the glass adjacent the thermo-couple ascends to a predetermined point.

4. A combination of a source of molten glass, a flow spout communicating therewith and having a submerged outlet, fluid-fuel means arranged to deliver a heating flame upon the surface of the glass within the flow spout closely adjacent the submerged outlet, valve mechanism for controlling the flow of fuel to the fuel delivery means, means for automatically opening and closing said valve mechanism, a thermo-couple arranged to be affected by temperatures of the molten glass between the source of supply and the point of application of local heat and away from direct heat from the heating flame, and means controlled by said thermo-couple for controlling the actuation of the valve-actuating means, whereby upon drop of glass heat to a predetermined minimum above gravity-flow temperature, heat will be automatically applied locally to the glass between the source of supply and the receiving end of the submerged outlet and such application will be continued until a predetermined rise in temperature of the glass adjacent the thermo-couple is effected.

5. A combination of a source of molten glass, a flow spout communicating therewith and having a submerged outlet, a fluid-fuel means arranged to deliver a heating flame upon the surface of the glass within the flow spout closely adjacent the submerged outlet, valve mechanism for controlling the flow of fuel to the fuel delivery means, means comprising an electric motor for automatically opening and closing said valve mechanism, a thermo-couple arranged to be affected by temperatures of the molten glass between the source of supply and the point of application of local heat and away from the direct effect of heat from the heating flame, and means controlled by said thermo-couple for controlling the actuation of the valve-actuating means, whereby upon drop of glass heat to a predetermined minimum above gravity-flow temperature, heat will be automatically applied locally to the glass between the source of supply and the receiving end of the submerged outlet and such application will be continued until a predetermined rise in temperature of the glass adjacent the thermo-couple is effected said means comprising a controlling element connected to and controlled by the thermo-couple and controlling the energizing circuit of the electric motor.

6. The combination of a source of molten glass, a covered flow spout communicating therewith and having a submerged outlet near its outer end, a fluid-fuel means arranged to deliver a heating flame upon the surface of the glass within the flow spout closely adjacent the submerged outlet, a valve mechanism for controlling the flow of fuel to the fuel delivery means, means for automatically opening and closing said valve mechanism, a thermo-couple projected into the flow spout closely adjacent the surface of the glass between the source of supply and the point of application of local heat, a baffle plate arranged between said thermo-couple and the fuel-delivery means, and means controlled by said thermo-couple for controlling the actuation of the valve-actuating means, whereby upon drop of glass heat to a predetermined minimum above gravity flow temperature closely adjacent the thermo-couple, heat will be automatically applied locally to the surface of the glass between the source of supply and the receiving end of the submerged outlet and between the thermo-couple and the submerged outlet and such application will be continued until a predetermined rise in temperature of the glass adjacent the thermo-couple is effected.

7. The combination of a source of molten glass, a covered flow spout communicating therewith and having a submerged outlet near its outer end, a refractory tube, having an external diameter in excess of the submerged outlet, arranged vertically above said outlet with its lower end submerged in the molten glass, means by which said tube may be vertically adjusted, means by which alternate plus and minus air pressures may be established within the upper end of said tube, means by which heat may be applied locally to the surface of the glass around said tube, and means by which the delivery of fluid fuel to said local heating means may be controlled, said means comprising a thermo-couple projected into the flow spout closely adjacent the surface of the glass therein at a point between the source of supply and the submerged orifice, and a baffle projected into the flow spout above the surface of the glass between said thermo-couple and the local heating means.

In witness whereof, I, FRED E. JEWETT, have hereunto set my hand at Muncie, Indiana, this 7th day of June, A. D. one thousand nine hundred and twenty-eight.

FRED E. JEWETT.